(12) United States Patent
Nadeau et al.

(10) Patent No.: US 11,338,514 B2
(45) Date of Patent: May 24, 2022

(54) PROTECTIVE FILAMENT GUIDE TUBE FOR ADDITIVE MANUFACTURING SYSTEM

(71) Applicant: Stratasys, Inc., Eden Prairie, MN (US)

(72) Inventors: Jordan Paul Nadeau, St. Louis Park, MN (US); Peter D. Schuller, Elko, MN (US)

(73) Assignee: Stratasys, Inc., Eden Prairie, MN (US)

( * ) Notice: Subject to any disclaimer, the term of this patent is extended or adjusted under 35 U.S.C. 154(b) by 580 days.

(21) Appl. No.: 16/185,751

(22) Filed: Nov. 9, 2018

(65) Prior Publication Data

US 2020/0147882 A1 May 14, 2020

(51) Int. Cl.
| | |
|---|---|
| B29C 64/209 | (2017.01) |
| B29C 64/321 | (2017.01) |
| B29C 64/118 | (2017.01) |
| B33Y 10/00 | (2015.01) |
| B33Y 30/00 | (2015.01) |
| B33Y 50/02 | (2015.01) |
| B29C 64/393 | (2017.01) |
| B33Y 40/00 | (2020.01) |

(52) U.S. Cl.
CPC .......... *B29C 64/321* (2017.08); *B29C 64/118* (2017.08); *B29C 64/209* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ... B29C 64/321; B29C 64/118; B29C 64/209; B29C 64/00; B33Y 10/00; B33Y 30/00; B33Y 40/00
See application file for complete search history.

(56) References Cited

U.S. PATENT DOCUMENTS

| | | |
|---|---|---|
| 3,747,961 A | 7/1973 | Couch et al. |
| 5,121,329 A | 6/1992 | Crump |
| 5,503,785 A | 4/1996 | Crump et al. |
| (Continued) | | |

OTHER PUBLICATIONS

"Braided Stainless Steel Flexible Supply Lines," website, Nov. 10, 2017, https://web.archive.org/web/20120507065726/https://www.plumbingsupply.com/braidedstainlessflexes.htmlbraidedstainlessfexes.html.

(Continued)

*Primary Examiner* — Joseph S Del Sole
*Assistant Examiner* — Baileigh Kate Darnell
(74) *Attorney, Agent, or Firm* — Peter J. Ims; Westman, Champlin & Koehler, P.A.

(57) ABSTRACT

An additive manufacturing system includes a substantially moisture-impermeable barrier comprising a guide tube assembly for supplying filament from a filament supply to a print head in an extrusion-based additive manufacturing system, where the print head melts the filament and extrudes the melted filament to form a 3D part. The guide tube assembly includes an inner tube permeable to moisture and an outer tube that s substantially moisture impermeable. The inner tube has an interior passageway configured to receive the filament, and has a relatively low coefficient of friction to minimize drag force as the filament travels through it. The outer tube surrounds the inner tube and provides a substantially moisture-impermeable barrier around the inner tube.

19 Claims, 8 Drawing Sheets

(56) References Cited

U.S. PATENT DOCUMENTS

| | | | |
|---|---|---|---|
| 6,054,077 A * | 4/2000 | Comb | B29C 48/155 |
| | | | 264/40.7 |
| 6,547,995 B1 | 4/2003 | Comb | |
| 7,122,246 B2 | 10/2006 | Comb et al. | |
| 7,384,255 B2 | 6/2008 | LaBossiere et al. | |
| 7,604,470 B2 | 10/2009 | LaBossiere et al. | |
| 7,625,200 B2 | 12/2009 | Leavitt | |
| 7,896,209 B2 | 3/2011 | Batchelder et al. | |
| 8,153,182 B2 | 4/2012 | Comb et al. | |
| 8,221,669 B2 | 7/2012 | Batchelder et al. | |
| 8,419,996 B2 | 4/2013 | Swanson et al. | |
| 8,647,102 B2 | 2/2014 | Swanson et al. | |
| 8,926,882 B2 | 1/2015 | Batchelder et al. | |
| 8,985,497 B2 | 3/2015 | Mannella et al. | |
| 9,050,788 B2 | 6/2015 | Swanson et al. | |
| 9,058,917 B2 | 6/2015 | Koelblin et al. | |
| 9,073,263 B2 | 7/2015 | Mannella et al. | |
| 9,321,608 B2 | 4/2016 | Beery et al. | |
| 9,714,153 B2 | 7/2017 | Beery et al. | |
| 2006/0029755 A1 | 2/2006 | Tkacik et al. | |
| 2010/0269504 A1 | 10/2010 | Gage et al. | |
| 2010/0327479 A1 * | 12/2010 | Zinniel | B29C 64/118 |
| | | | 264/172.14 |
| 2013/0161442 A1 | 6/2013 | Mannella et al. | |
| 2013/0234366 A1 * | 9/2013 | Batchelder | B33Y 40/00 |
| | | | 264/308 |
| 2014/0322383 A1 * | 10/2014 | Rutter | B29C 64/209 |
| | | | 425/500 |
| 2015/0158691 A1 | 6/2015 | Mannella et al. | |
| 2016/0236409 A1 * | 8/2016 | Armani | B29C 64/118 |
| 2016/0361873 A1 | 12/2016 | Maier | |
| 2017/0157855 A1 | 6/2017 | Larson et al. | |
| 2017/0182594 A1 | 6/2017 | Crear et al. | |
| 2017/0268133 A1 | 9/2017 | Graley et al. | |
| 2017/0298521 A1 | 10/2017 | Demuth et al. | |
| 2018/0043627 A1 | 2/2018 | Barclay et al. | |

OTHER PUBLICATIONS

Crane ChemPharma Flow Solutions,"Resistoflex,",,pp. 1-100, Oct. 2009, www.cranechempharma.com.

Crain Resistoflex, "Plastic-Lined Pipe & Fittings for Corrosion-Resistance,", website, Nov. 10, 2017, https://web.archive.org/web/20120622232819/http://www.corrosionfluid.com/teflon_lined_pipe.aspx.

Aflex Hose, "Smoothbore PTFE Lined High Pressure Hose,", USA SB/18.01.17 Rev 36, pp. 1-20.

* cited by examiner

PROTECTIVE FILAMENT GUIDE TUBE FOR ADDITIVE MANUFACTURING SYSTEM

BACKGROUND

The present disclosure relates generally to additive manufacturing systems for building three-dimensional (3D) parts with layer-based, additive manufacturing techniques, and more specifically to additive manufacturing systems for building parts with moisture-sensitive filament feedstock materials.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

Whichever print system architecture is used, the printing operation for fused deposition modeling is dependent on extruding build materials at a predictable and targeted extrusion rate. A polymeric consumable feedstock material, such as a spooled filament, can absorb moisture resulting in a degraded performance and print quality, unless steps are taken to dry the consumable material and/or maintain dryness of the material before it is printed. When the polymer material is heated to its extrusion temperature, any moisture contained in the material may boil and vaporize, creating voids and defects in the extruded roads. High-temperature polymers and composite materials are particularly susceptible to this problem. Hydrophilic materials used to print soluble supports are likewise susceptible to degradation caused by moisture penetration in the feedstock material. There is an ongoing need for improved reliability in printing parts from materials that are sensitive to moisture using extrusion-based additive manufacturing techniques.

SUMMARY

In one aspect of the present disclosure, an additive manufacturing system includes a print head configured to selectively receive a filament, melt the filament, and deposit the melted filament to form a three-dimensional (3D) part, and a guide tube assembly coupled to the print head and configured to support and guide the filament to the print head. The guide tube assembly includes an inner tube permeable to moisture and an outer tube that is substantially moisture impermeable. The inner tube has an interior passageway configured to receive filament from a filament supply, and has a relatively low coefficient of friction to minimize drag force as the filament travels through it. The outer tube surrounds the inner tube, and forms a substantially moisture-impermeable barrier for the filament traveling through the guide tube assembly from the filament supply to the print head.

In another aspect, a method of operating an additive manufacturing system includes feeding a filament of a hygroscopic material through a guide tube assembly to a print head, such that the filament is fed through a passageway of an inner tube of the guide tube assembly, blocking ambient moisture from reaching the filament while being fed through the feed tube assembly with a substantially moisture-impermeable outer tube that surrounds the inner tube along substantially an entire length of the feed tube assembly, receiving the filament in the print head, heating the hygroscopic material of the filament in the print head to a flowable state, and selectively depositing the hygroscopic material of the filament in the flowable state to form a three-dimensional (3D) part in a layer-by-layer manner.

In another aspect, an additive manufacturing system includes a print head configured to selectively receive a filament made of a hygroscopic material, melt the hygroscopic material of the filament, and deposit the melted hygroscopic material of the filament to form a three-dimensional (3D) part in a layer-by-layer manner, and a guide tube assembly coupled to the print head and configured to support and guide the filament to the print head. The guide tube assembly includes an inner tube made of a polymeric material, and an outer tube made of a metallic material. The outer tube surrounds the inner tube along substantially an entire length of the tube assembly and forms a continuous barrier between the inner tube and an ambient environment. The continuous barrier is substantially moisture-impermeable and substantially oxygen-impermeable.

In yet another aspect, an additive manufacturing system includes a print head configured to selectively receive a filament, melt the filament, and deposit the melted filament to form a three-dimensional (3D) part, and a guide tube assembly coupled to the print head and configured to support and guide the filament to the print head. The guide tube assembly includes an inner tube made of a polymeric material, and an outer tube made of a substantially moisture-impermeable material. The outer tube surrounds the inner tube along substantially an entire length of the guide tube assembly and forms a continuous barrier between the inner tube and an ambient environment.

The present summary is provided only by way of example, and not limitation. Other aspects of the present invention will be appreciated in view of the entirety of the present disclosure, including the entire text, claims and accompanying figures.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "printing onto", such as for "printing a 3D part onto a print foundation" includes direct and indirect printings onto the print foundation. A "direct printing" involves depositing a flowable material directly onto the print foundation to form a layer that adheres to the print foundation. In comparison, an "indirect printing" involves depositing a flowable material onto intermediate layers that are directly printed onto the receiving surface. As such, printing a 3D part onto a print foundation may include (i) a situation in which the 3D part is directly printed onto to the print foundation, (ii) a situation in which the 3D part is directly printed onto intermediate layer(s) (e.g., of a support structure), where the intermediate layer(s) are directly printed onto the print foundation, and (iii) a combination of situations (i) and (ii).

The term "providing", such as for "providing a chamber" and the like, when recited in the claims, is not intended to require any particular delivery or receipt of the provided item. Rather, the term "providing" is merely used to recite items that will be referred to in subsequent elements of the claim(s), for purposes of clarity and ease of readability.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a substantially moisture-impermeable barrier comprising a guide tube assembly for supplying filament feedstock to a print head in an extrusion-based additive manufacturing system, a method of operating an additive manufacturing system by feeding a filament of a hygroscopic material to a print head through a passageway of a moisture-impermeable barrier comprising a guide tube assembly having an inner tube permeable to moisture and an outer tube that provides a moisture barrier, and a method of printing a part utilizing the consumable material.

In the following detailed description of examples, reference is made to specific embodiments by way of drawings and illustrations. These examples are described in sufficient detail to enable those skilled in the art to practice what is described, and serve to illustrate how elements of these examples may be applied to various purposes or embodiments. Other embodiments exist, as will be appreciated by those of ordinary skill in the art. For instance, features or limitations of various embodiments described herein, however important to the embodiments in which they are incorporated, do not limit other embodiments, and any reference to the elements, operation, and application of the examples serve only to define these examples. Features or elements shown in various examples described herein can be combined in ways other than shown in the examples, and any such combinations is explicitly contemplated to be within the scope of the examples presented here. The following detailed description does not, therefore, limit the scope of what is claimed.

A wide variety of additive manufacturing technologies exist, and are operable to print, build, or otherwise produce 3D parts and/or support structures in a layer-by-layer manner, at least in part using an additive manufacturing technique or system. The additive manufacturing system may be a stand-alone unit, robotic system, a sub-unit of a larger system or production line, and/or may include other non-additive manufacturing features, such as subtractive-manufacturing features, pick-and-place features, two-dimensional printing features, and the like.

Such additive manufacturing systems can utilize one or more filaments (or other feedstock) of desired material(s) that are converted to a flowable state and extruded for layer-wise deposition to build a given 3D part. A typical material of the filament is a thermoplastic polymer material. When used in additive manufacturing systems, the thermoplastic polymer material can be used as part material or support material. The material of the filament can also include active ingredients that are susceptible to degradation when exposed to moisture or certain gasses, such as oxygen. The material of the filament can also include foodstuffs that can also be sensitive to moisture and gas transmission.

Many polymer materials that are used as filaments in an additive manufacturing system are susceptible to moisture absorption, for example, hygroscopic thermoplastic materials. If exposed to ambient air, these materials will absorb moisture from the air, and their printing performance will be degraded. When filament material is heated to extrusion temperatures in an extruder or liquefier, any moisture contained in the filament may boil, and the resultant water vapor may result in voids and other detrimental physical effects in the material as it is extruded as a portion of a printed part. When the material absorbs moisture, melting and extruding the material can be difficult due to foaming caused by the rapid change in volume of the moisture as it transforms state from a liquid to a vapor. Foaming has been found to be a problem in extruding support materials in an additive manufacturing system, because a typical support material is a water-soluble material that readily absorbs moisture from the environment. Further, the extrusion of material with absorbed moisture can adversely affect physical properties of the material. High temperature polymers and composite materials are particularly susceptible to this problem. In some instances, the amount of absorbed moisture can result in a part build with an inaccurate shape; the part would then be discarded.

Additionally, some filament materials have abrasive qualities, or contain abrasive embedded materials, such as carbon fiber or glass filler particulates. Contact between such abrasive filaments and components of additive manufacturing systems can produce wear on those system components.

Figure 1:
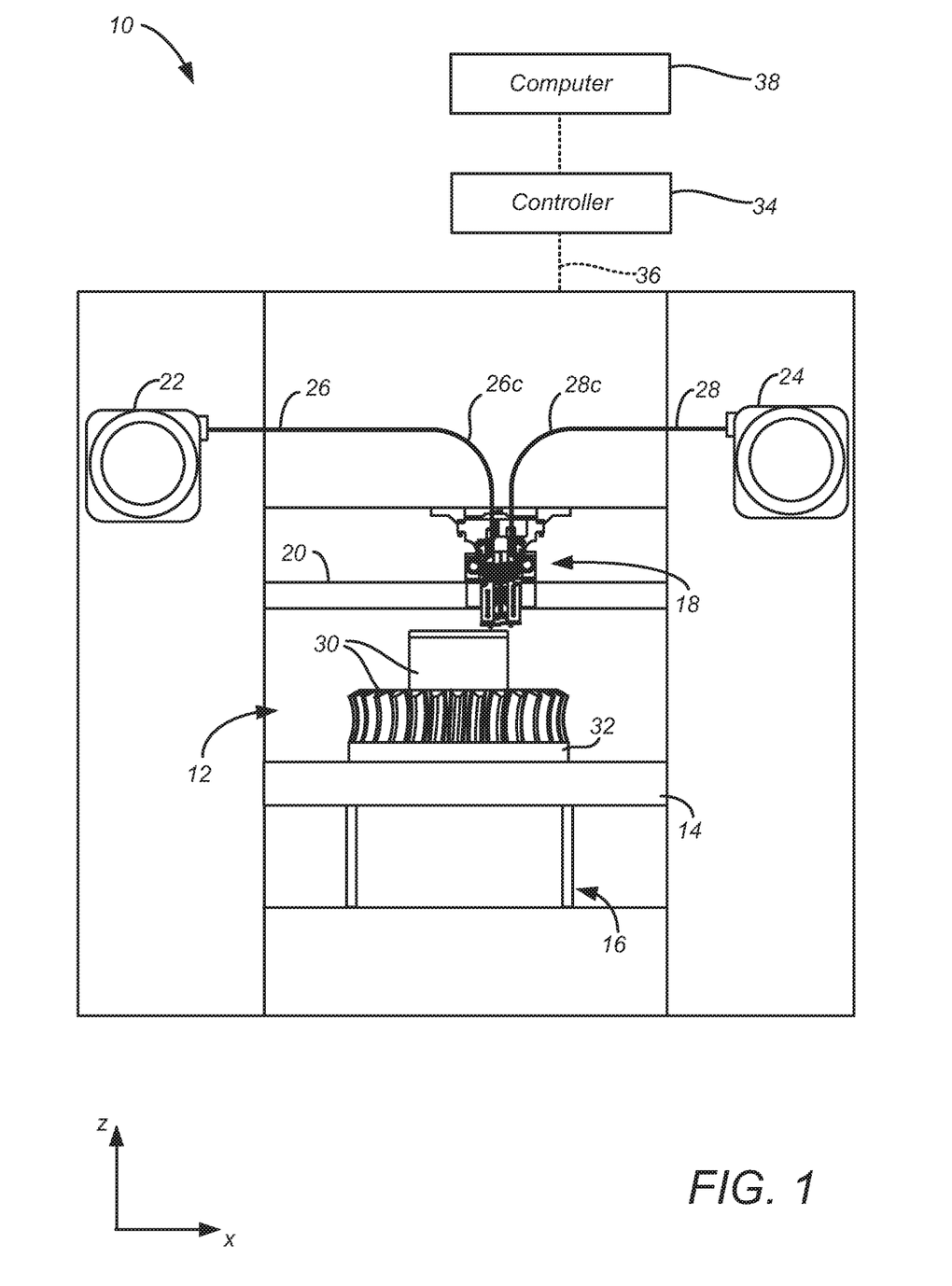
FIG. 1 is a schematic front view of an example additive manufacturing system.

FIG. 1 is a schematic front view of an example additive manufacturing system 10. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 and any printed objects. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 via guide tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; Swanson et al., U.S. Pat. Nos. 8,419,996 and 8,647,102; Batchelder U.S. Pat. No. 8,926,882; and Barclay et al. U.S. Published Patent Application 20180043627. In one example, during a build operation, one or more drive mechanisms (shown in FIG. 2) are directed to intermittently feed the modeling and support materials via guide tube assemblies 26 and 28 through print head 18 from supply sources 22 and 24.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 including a heating unit for chamber 12, print head 18, and various sensors, calibration devices, display devices, and/or user input devices.

System 10 and/or controller 34 can also communicate with computer 38, which can include one or more discrete computer-based systems that communicate with system 10 and/or controller 34, and may be separate from system 10, or alternatively may be an internal component of system 10. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part material is deposited in layers along toolpaths that build upon one another to form the 3D part 30.

Figure 2:
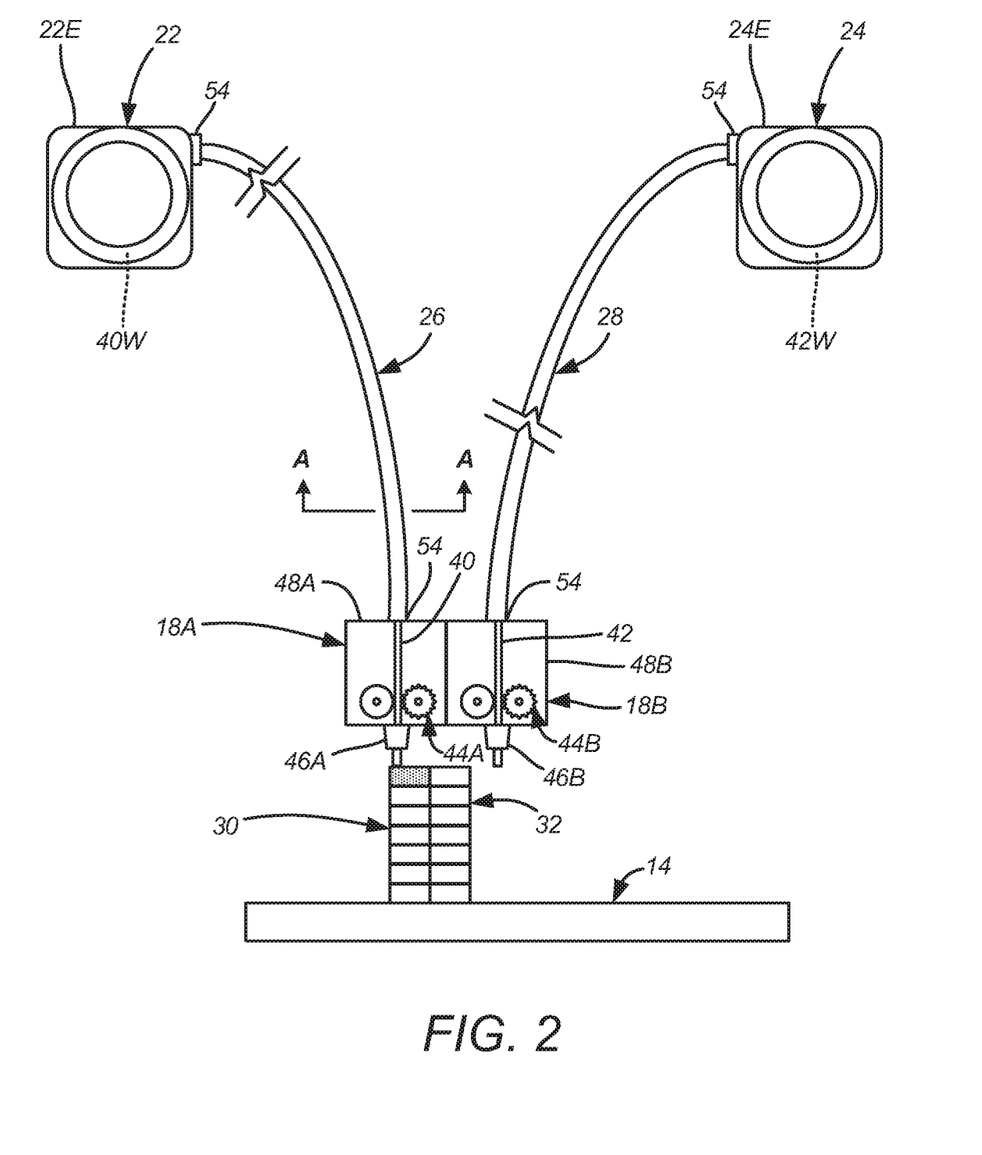
FIG. 2 is a schematic front view of a portion of the additive manufacturing system of FIG. 1.

FIG. 2 is a schematic front view of a portion of the additive manufacturing system 10. The 3D part 30 and the support structure 32 are each printed layer-by-layer, using filaments 40 and 42 carried from consumable assemblies 22 and 24 to print heads 18A and 18B through guide tube assemblies 26 and 28, all respectively.

Filaments 40 and 42 can have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. Alternatively, filaments 40 and 42 can have a non-cylindrical geometry, such as a ribbon filament as disclosed in Batchelder et al., U.S. Pat. No. 8,221,669. It is understood that "ribbon filament" may have a rectangular cross-sectional geometry with right-angle corners and/or with rounded corners such as an elliptical or a round geometry. Furthermore, filaments 40 and 42 can alternatively have a hollow geometry and/or a core-shell geometry that includes multiple distinct materials. Filaments 40 and 42 further may be coated with an exterior moisture-repellant material to minimize hygroscopic absorption, as disclosed in Demuth, U.S. patent application No. 20170298521.

Each filament 40 and 42 is drawn into the respective print head 18A and 18B in the illustrated embodiment of FIG. 2, by drive mechanisms 44A and 44B, which can engage and selectively draw the corresponding filament 40 and 42 from the consumable assembly 22 or 24 through guide tube assemblies 26 and 28 and into the print head 208. When drawn, the filaments 40 and 42 can each pass directly from the consumable assembly 22 or 24 into the respective guide tube assembly 26 or 28. The guide tube may consist of a fixed and unmovable portion secured within the printer housing, and also a more flexible portion connected to the print head for localized movement. Depending on the filament feed supply configuration, either fixed, flexible or a combination of fixed and flexible routing may be used.

A given drawn filament 40 or 42 is heated and extruded at or in a nozzle 46A or 46B, and is then deposited on the 3D part 30 and/or support structure 32, where the extruded material from the filament 40 or 42 bonds to the existing, accumulated layers, forming a new layer. Each print head 18A and 18B can include a housing 48A and 48B, to enclose portions of the filaments 40 and 42 that engage the drive mechanisms 44A and 44B. In the illustrated embodiment, housings 48A and 48B completely surround portions of the filaments 40 and 42 between exit ends of the guide tube assemblies 26 and 28 and the nozzles 46A and 46B. The filament 40 can be made of part (or model) material, used to build the 3D part 30, and the filament 42 can be made of support material, used to build the support structure 32, for example. The filaments 40 and 42 are therefore drawn as needed to form the 3D part 30 and the support structure 32, and drive mechanisms 44A and 44B may start and stop as the print heads 18A and 18B traverse the workspace of system 10. Selective control of drive mechanisms 44A and 44B, as well as heating of nozzles 46A and 46B can be governed by controller 34.

While print heads 18A and 18B are shown as part of a dual-tip configuration, with the print heads 18A and 18B linked together for common movement about the workspace (collectively as print head 18), with toggling in and out of a print plane, it should be noted that in further embodiments the print heads 18A and 18B can be actuated and moved independently.

In some examples, the filaments 40 and 42 used to print the 3D part 30 and support structure 32 are stored in consumable assemblies 22 and 24. As shown in the illustrated embodiment, each consumable assembly 22 and 24 can include an enclosure 22E and 24E and a length 40W and 42W of the respective filament 40 and 42. The length 40W or 402W of the filament 40 or 42 in the enclosure 22E or 24E can be wound, spooled, coiled or otherwise arranged for storage in a desired manner that allows for the filament 40 or 42 to be selectively drawn from the enclosure 22E or 24E for use building the 3D part 30 or support structure 32. Enclosures 22E and 24E can be substantially gas-impermeable (e.g., oxygen-impermeable) and substantially moisture-impermeable, while still allowing the filament 40 or 42 to exit the enclosure 22E or 24E to the guide tube assembly 26 or 28.

Each filament 40 and 42 is guided to the print heads 18A and 18B by the respective guide tube assembly 26 and 28. The guide tube assemblies 26 and 28 can guide the filaments 40 and 42 along feed paths, and may have a substantially rigid, stationary portion within the interior of system 10, as well as a flexible tubing portion which moves substantially freely along with the print head, and can include one or more radiused curves 26c and 28c (see FIG. 1). Curved and sometimes tortuous feed paths may be necessary or desirable, such as to allow consumable assemblies 22 and 24 to be positioned in desirable locations. However, because some materials of filaments 40 and 42 are relatively brittle, or may become brittle under certain conditions, it may be desired to maintain a minimum radius of curvature of the filaments 40 and 42 along the feed paths. When filament contains particulates, they become more fragile and brittle as the loading increases. The guide tube assemblies 26 and 28 can provide a supportive path that maintains such a desired minimum radius of curvature, to reduce a risk of cracking or fracture of brittle filaments 40 and 42. Brittle filament materials are typically wound onto spools that are larger in diameter than a common filament spool, to accommodate their fragility; with a larger diameter spool (up to a 24" diameter spool), the curvature forced onto the filament is diminished.

Moreover, guide tube assemblies 26 and 28 can be sufficiently rigid to prevent undesirable filament movement, while remaining sufficiently flexible to allow satisfactory operational performance and relative movement between print heads 18A and 18B and the consumable assemblies 22 and 24. Sharp curvature during travel through the tubing path should be minimized to prevent the filament from breaking within the guide tube assembly and before the filament is delivered to the liquefier or extruder. As discussed further below, the guide tube assemblies 26 and 28 can suitably guide the filaments 40 and 42 while simultaneously providing a barrier to the ambient environment to reduce or eliminate gas- and/or moisture-absorption by the filaments 40 and 42.

Figure 3:
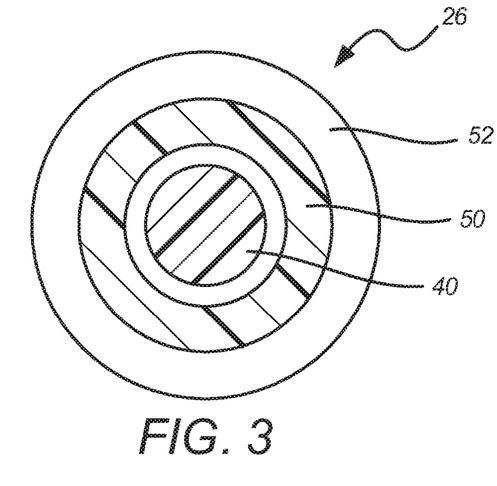
FIG. 3 is a cross-sectional view of one embodiment of a feed tube assembly, taken along line A-A of FIG. 2.

FIG. 3 is a cross-sectional view of one embodiment of the guide tube assembly 26, taken along line A-A of FIG. 2. Guide tube assembly 28 can have a similar cross-sectional configuration to guide tube assembly 26. As shown in the illustrated embodiment, guide tube assembly 26 includes an inner tube 50 and an outer tube 52. The inner tube 50 has a passageway through which filament 40 travels, such that the filament 40 can be drawn through the passageway. Contact between the filament 40 and the inner tube 50 can force the filament 40 to follow the feed path when drawn toward the print head 18A (see FIGS. 1 and 2).

Inner surfaces of the guide tube assemblies 26 and 28 have a relatively low coefficient of friction to minimize drag force between the guide tube assemblies 26 and 28 and the filament while being sufficiently durable to minimize wear from contact between the filament and the guide tube assemblies 26 and 28 must provide a slippery surface for filament to travel across, so as not to create additional drag force. It must also be durable enough so as not to wear away as abrasive filament travels past it. The outer tube 52 surrounds and encases the inner tube 50 along substantially an entire length of the inner tube 50, from the enclosure 22E of the consumable assembly 22 to at least proximate the housing 48A of the print head 18A. In this way, the outer tube 52 provides a barrier or sheath between the ambient moisture of the environment and both the inner tube 50 and the filament 40.

As shown in FIG. 3, the inner and outer tubes 50 and 52 are each elongate and generally cylindrical in shape, and are arranged in a generally coaxial manner. It should be noted that in further embodiments non-cylindrical tube shapes can be utilized, such as a rectangular cross-sectional tube shape.

In some embodiments, conditioned air can be provided into guide tube assembly 26, or at or near a terminus of the guide tube assembly 26, in a manner disclosed in Larson et al., U.S. Pat. App. Pub. No. 2017/0157855. In other words, an environment within guide tube assembly 26 exposed to the filament 40 can be controlled, such as to regulate moisture content, apply some heat to gently remove moisture, etc. In further embodiments, an inert gas such as argon or other a gas that is substantially non-reactive with the material of the filament 40, such as nitrogen, can be provided within guide tube assembly 26.

The inner tube 50 of the present disclosure can be made of a polymeric material which allows for acceptable slip/passage of the filament through the guide tube. In one embodiment, the inner tube 50 is made of nylon. Nylon is wear-resistant properties, while being self-lubricating. In another embodiment, the inner tube 50 is made of polytetrafluoroethylene (PTFE). In yet another embodiment, the inner tube 50 is made of polypropylene. Additionally, in some embodiments, a lubricant (e.g., siloxane) can be applied along an interior surface of the inner tube 50, or alternatively impregnated or embedded in the inner tube 50. The presence of lubricant, while optional, can reduce the drawing force necessary to draw the filament 40 from the consumable assembly 22 to the print head 18A.

The polymeric material of the inner tube 50 can provide relatively good tribological properties in relation to movement of the filament 40. For instance, the inner tube 50 made of polymeric material can provide relatively good resistance to wear from filament 40 while still limiting friction and drawing force requirements, even where the filament 40 has abrasive characteristics.

The coefficient of friction (COF) of a tubing material is a good indicator of a filament's ability to easily slide across its surface, both from a static and dynamic performance standpoint. A low COF is preferred to minimize the amount of friction as much as possible, thus minimizing the energy required to transfer filament within the machine. For example, the static COF for carbon filled polyamide filament within polytetrafluoroethylene (PTFE) tubing is roughly 0.10-0.15 (a relatively low unitless number), while the combination of carbon filled polyamide filament within polyamide tubing is roughly 0.2-0.25. The COF of carbon filled polyamide filament within steel tubing is roughly 0.40. The use of thermoplastic filament inside a tubing of PTFE allows for much better slip performance than that of steel/metal tubing.

While the polymeric tubing good at allowing proper filament travel, the polymeric inner tube 50 does not provide sufficient barrier to resist unwanted gasses and moisture from permeating through the tube 50 and into contact with the filament. For instance, traditional nylon tubing in an environment with 50% relative humidity can absorb from 1-3% water from the air, by weight, depending on composition, and when saturated with water can absorb from 1.5-10% water. Such moisture absorbed by nylon tubing can be undesirably transferred to and/or absorbed by a hygroscopic filament.

The outer tube 52 can be configured as a substantially continuous barrier or sheath that surrounds substantially the entire length of the inner tube 50, such as from the enclosure 22E to the print head 18A. In this context, a substantially continuous barrier is substantially free of holes, gaps, voids or other such interruptions that would allow the transmission of moisture and/or gasses past the outer tube 52. The outer tube 52 can be sealed to the enclosure 22E and/or the print head 18A with suitable seals 54, or the outer tube 52 can be sealed to the inner tube 50 proximate the opposite ends of the inner tube 50. The outer tube 52 can be made of a substantially moisture-impermeable and substantially oxygen-impermeable material, such as a metallic material like stainless steel, metallized biaxially-oriented polyethylene terephthalate (Mylar® film available from E. I. Du Pont de Nemours and Company, Wilmington, Del.) or metal foil tape. In this way, the outer tube 52 can substantially prevent moisture and gases such as oxygen from reaching the filament 40 (or the inner tube 50), and allows the filament 40 to maintain substantially the same moisture content along the feed path, that is, to have substantially the same moisture content when exiting the guide tube assembly 26 at the print head 18A as when entering the opposite end of the guide tube assembly 26 at the consumable assembly 22. And likewise, the outer tube 52 can reduce or prevent the absorption of gasses to the filament 40 while traveling along the feed path.

In addition to functioning as a barrier against moisture and gasses in the ambient environment, the outer tube 52 also performs structural functions. For example, in embodiments in which the outer tube 52 is made of a metal material like stainless steel, the outer tube 52 can provide sufficient rigidity to the guide tube assembly 26 to maintain a bend radius, in which a desired minimum curve radius is maintained and substantially the entire weight of the guide tube assembly 26 is supported, while still maintaining flexibility to accommodate relative movement between the print head 18A and the consumable assembly 22. In some instances, the outer tube 52 is sufficiently rigid to be non-moving or stationary. Moreover, the outer tube 52 can reduce a risk of crushing or collapsing of the inner tube 52.

Figure 4:
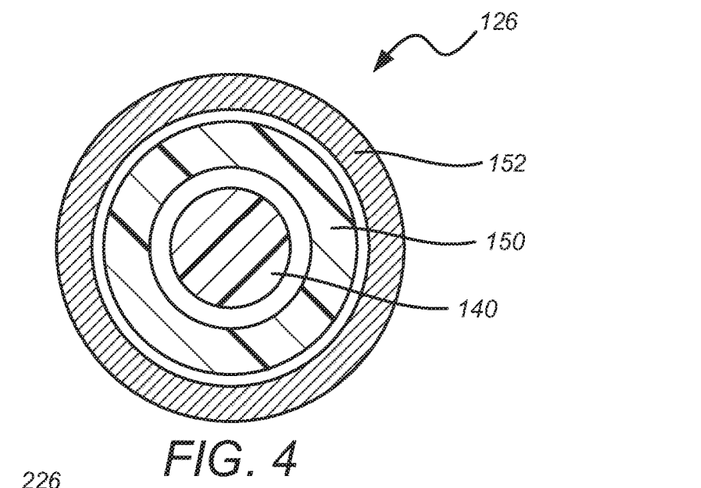
FIG. 4 is a cross-sectional view of another embodiment of the feed tube assembly.

As shown in the embodiment of FIG. 3, the outer tube 52 is arranged in direct contact with the inner tube 50. FIG. 4 is a cross-sectional view of another embodiment of guide tube assembly 126, in which a gap is present between the outer tube 52 and the inner tube 50, where all reference numbers have been increased by 100 relative to the embodiment 26.

Figure 5:
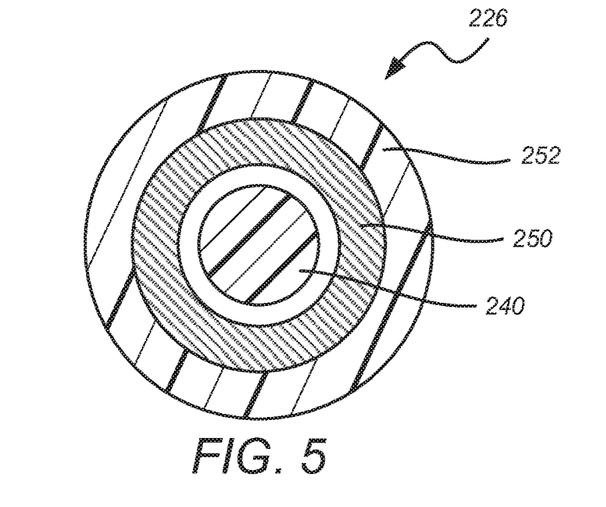
FIG. 5 is a cross-sectional view of yet another embodiment of the feed tube assembly.

FIG. 5 is a cross-sectional view of yet another embodiment of guide tube assembly 226, in which a gap is present between the filament 240 and the inner tube 250, where all reference numbers for similar elements have been increased by 200 relative to the embodiment 26. In still further embodiments, the guide tube assembly 226 could include a gap between the inner and outer tubes 250 and 252.

It should be noted that the embodiments of FIGS. 3-5 are shown by way of example and not limitation. The relative thicknesses of the inner tube 50 and the outer tube 52, and the size of any gap between them, can vary in further embodiments, for instance. In an exemplary and non-limiting embodiment, a stainless outer tubing at a thickness of 0.015" is manipulated into a desired feed path, and an inner tubing of Nylon, of thickness 0.04" is inserted within the stainless tube. However, the inner and outer tube can be made of any suitable materials that prevent moisture permeation through the feed tube while allowing the filament to easily pass through the inner tube. Moreover, the materials of the inner and outer tubes 50 and 52 can vary as desired for particular applications.

In some embodiments, a consumable assembly can be provided that includes a supply of filament, a filament storage enclosure, a guide tube assembly, and a print head that are pre-assembled together. An exemplary consumable assembly is illustrated in FIG. 6.

Figure 6:
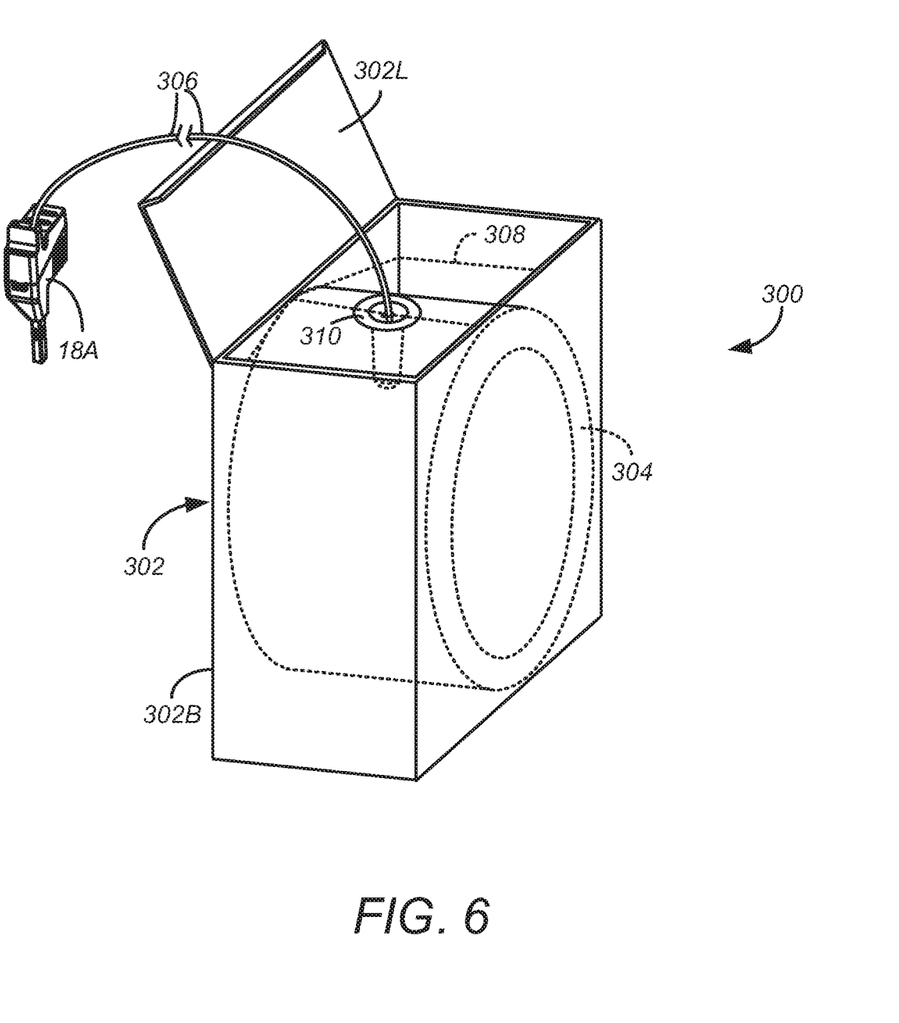
FIG. 6 is a perspective view of one embodiment of a consumable assembly.

FIG. 6 is a perspective view of one embodiment of a consumable assembly 300 that includes an enclosure 302 having a main body 302B (with a lid or cover flap 302L), a spool-less coil 304 of the filament 306, an optional liner 308, a payout tube 310, the guide tube assembly 26, and the print head 18A. The guide tube assembly 300 is coupled and sealed to the payout tube 310, which provides a passageway through the enclosure 302 for the filament 306. Examples of payout tubes are described in Mannella et al., U.S. Pat. No. 8,985,497. The print head 18A is coupled and sealed to the guide tube assembly 300, and can be engaged with the additive manufacturing system 10 (e.g., at the gantry 20). The consumable assembly 300 utilizes any of the guide tubes 26, 126 and 226 and allows the filament 306 to remain sealed from the ambient environment while the consumable assembly 300 is loaded into the additive manufacturing system 10, thereby avoiding exposure to the ambient environment for even brief periods of time that would otherwise be needed to thread or engage the filament 306 into existing structures of the system 10.

Figure 7:
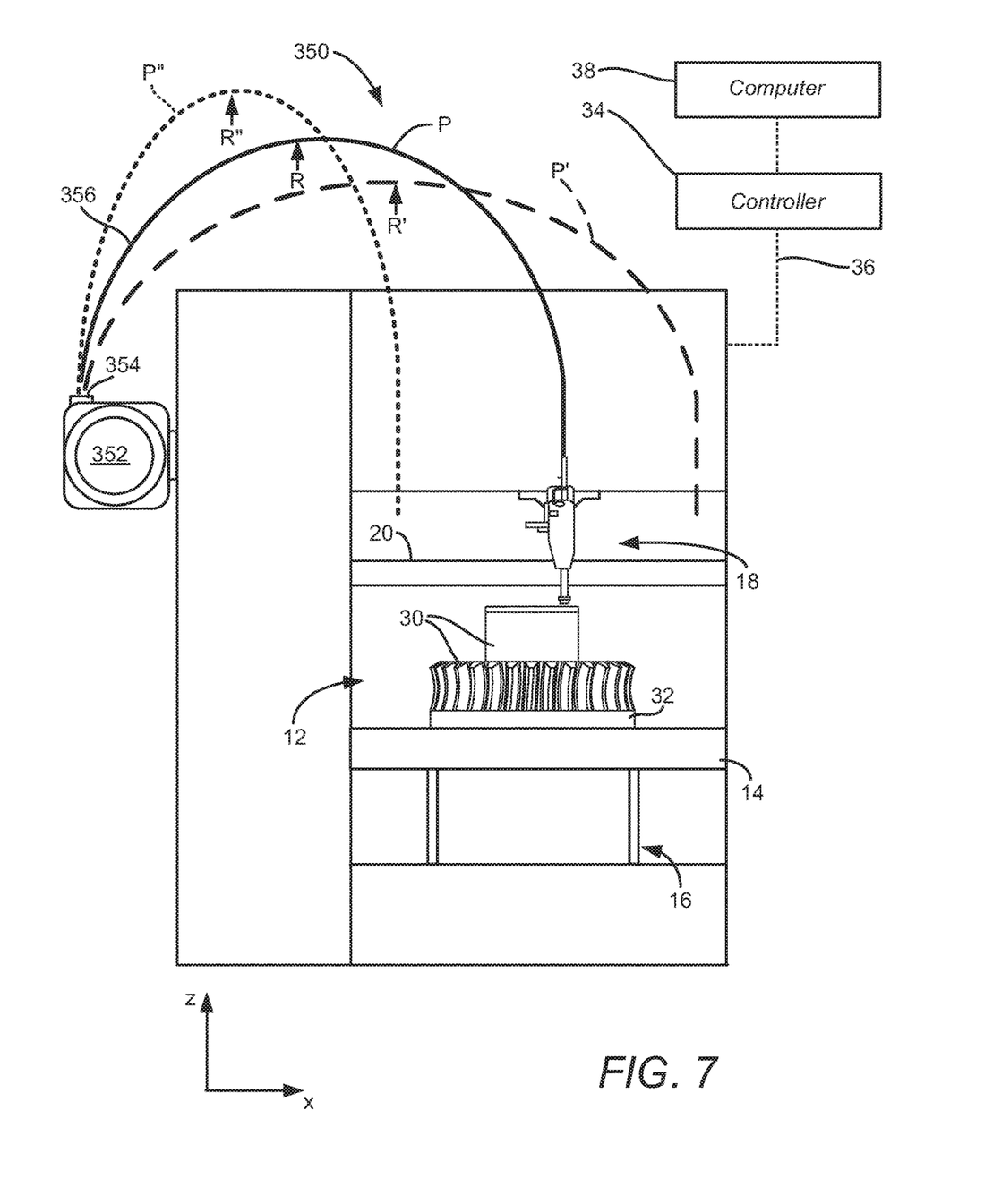
FIG. 7 is a perspective view of a flexible guide tube connected to a print head on a gantry and a stationary supply of filament.

FIG. 7 illustrates another embodiment of an additive manufacturing system at 350 where the like components of system 10 and like components of system 350 are given the same reference characters. A supply 352 of filament is located external to the system 350, however the supply 350 can be loaded into bays of the system 350.

The supply 352 has an exit port 354 that extends upwardly where a guide tube assembly 356 connects the exit port 354 to the print head 18. The guide tube assembly 356 has an inner and outer tube according to the present disclosure. The guide tube assembly 356 is sufficiently flexible to allow the print head 18 to move to any location within the range of the gantry 20, while being sufficiently self-supporting to maintain an arcuate configuration having a sufficiently large bend radius to allow the filament to pass there-though.

As illustrated schematically in FIG. 7, when the print head is centrally located within the chamber 12, the guide tube assembly 356 has a path P with a radius R. However, when the print head is moved to a position a greater distance from the supply 352, a height of the path P' is lowered and the R' is increased. When the print head 18 is moved proximate the source 352, the path P" is raised and the bend radius R" decreases.

Independent of the position of the print head 18 within the chamber 12, the guide tube assembly 356 is sufficiently flexible to provide a path with a radius that allows the filament to pass, while being sufficiently rigid to be self-supporting.

Figure 8:
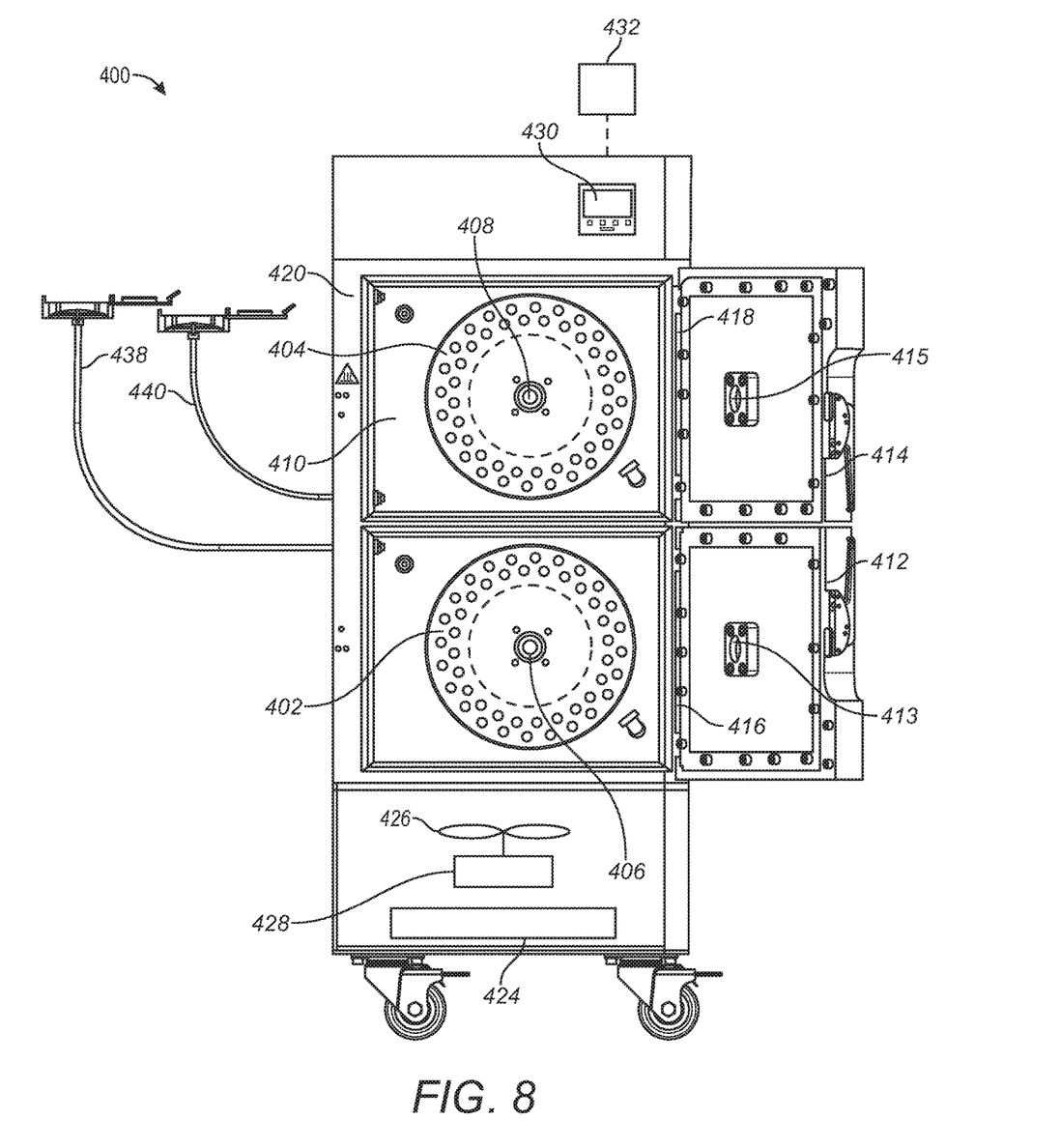
FIG. 8 is a front view of a cabinet for retaining spools of consumable material.
Figure 9:
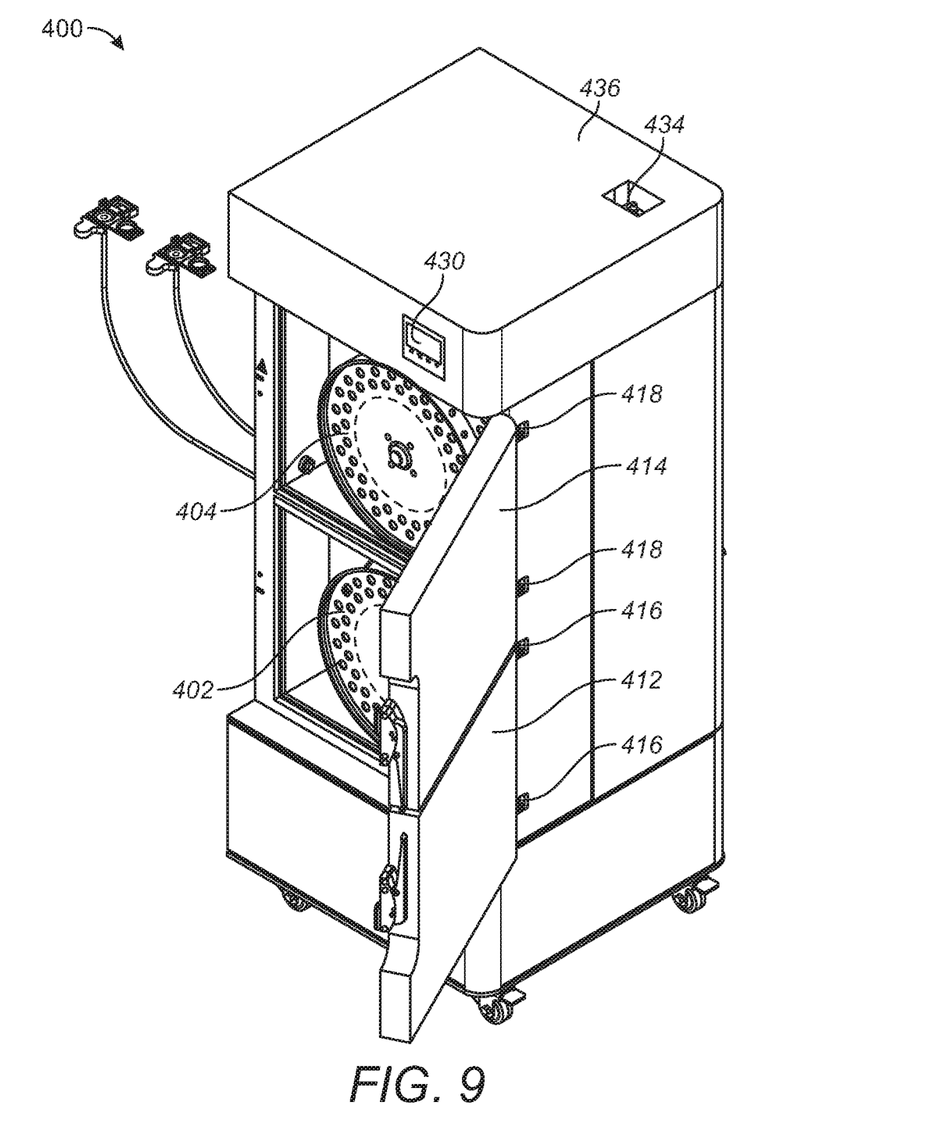
FIG. 9 is a perspective view of the cabinet for retaining spools of consumable material.

FIG. 8 is front view and FIG. 9 is a perspective view of a filament drying cabinet 400 configured to retain a plurality of spools 402 and 404 of filament. The spools 402 and 404 are retained on axels 406 and 408 extending from a back wall 410 of the cabinet 400 such that the spools 402 and 404 rotate about the axels 406 and 408, respectively to remotely store and feed filament to the additive manufacturing system 10.

Once the spools 402 and 404 are loaded onto the axels 406 and 408, respectively, doors 412 and 414 are moved about hinges 416 and 418 to a closed position on the front wall 420 of the cabinet 400. Each door 412 and 414 includes a receptacle 413 and 415 configured to accept ends of the axels 406 and 408 to retain the axels 406 and 408 in a substantially horizontal position such that the spools 402 and 404 can rotate and feed filament to the print head feed drive system.

The cabinet 400 includes a heater 424 and a fan 426 that is actuated by a motor 428. The heater 424 and the fan circulate hot air within the interior of the cabinet 400 to prevent the filaments from accepting moisture from the environment. The temperature within the cabinet 400 is dictated by the type of material being used as filament to an elevated temperature that is below the lowest glass transition temperature of filament materials to prevent the material from flowing.

The temperature is controlled by a control screen 430 that sends input signals to a controller 432. The controller 432 then sends signals to the heater 424 and motor 428 to control the temperature therein. While the cabinet 400 is under positive pressure to prevent unheated air from entering the cabinet 400, the cabinet 400 includes a vent 434 in a top wall 436 to cause the heated air to move past the spools 402 and 404 of filament which prevent the absorption of moisture. The humidity level in the cabinet 400 is controlled by monitoring and using temperature and relative humidity information. Optionally, a humidity sensor or sensor may be located within the cabinet 400 or the guide tube assembly to monitor the humidity surrounding the filament spools and/or along the filament path. Humidity measurements from the humidity sensor may be recorded by the system, and/or they may be used in a closed-loop fashion in order to maintain humidity within a target range or below a threshold level.

The cabinet 400 is configured to be spaced remotely from the system 10. Guide tubes 438 and 440 are attached to a wall of the cabinet 400 and provide a filament path to the interior of system 10 that prevents the absorption of moisture by the filament from the ambient air. The guide tubes 438 and 440 can have the configuration of previously described guide tubes 26, 126 and 226. A portion of the tubing path inside system 10 may be fixed and non-moving, while a portion connecting to the print head from the gantry may move along with it.

Figure 10:
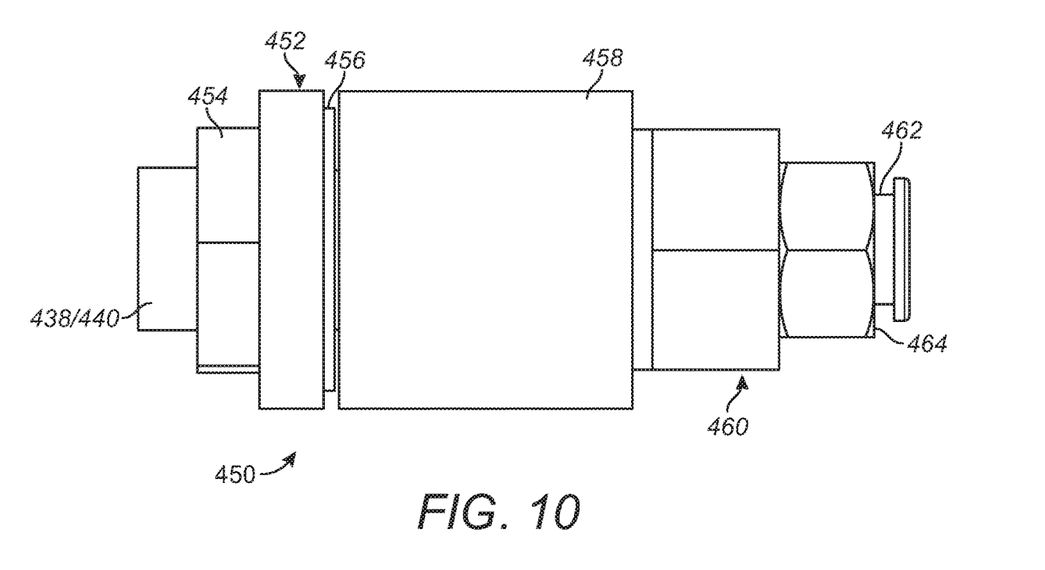
FIG. 10 is a side view of a connector for connecting a guide tube from a consumable assembly to an additive manufacturing system where from a consumable assembly spaced from the additive manufacturing system.

Referring to FIG. 10, a connector 450 is illustrated that connects a distal end of the guide tubes 438 and 440 to the system 10. The connector 450 includes a first end portion 452 that is configured to be positioned with the guide tubes 438 and 440. The first end portion 452 includes a retainer 454 that is positioned about the tube 438 and 440 to frictionally secure the tube 438 and 440 to the first end portion 452. The connector 450 includes an O ring 456 that seals the interface between the retainer 454 and a middle portion 458 to prevent ambient air from entering the filament path.

The second end portion 460 includes a groove 462 and shoulder 464 that is configured to be accepted into a receptacle (not shown) in system disclosed in U.S. Pat. No. 9,050,788, the contents of which are incorporated by reference such that the filament does not contact ambient air.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. An additive manufacturing system, comprising:
a print head configured to selectively receive a filament, heat the filament into a molten pool of filament material, and drive filament into the molten pool of filament material to deposit the molten pool of filament material through an extrusion nozzle to form a 3D part; and
a guide tube assembly configured to be coupled to the print head and configured to be coupled to a consumable assembly, the guide tube configured to provide a filament path for the filament from the consumable assembly to the print head, wherein at least a portion of the guide tube assembly is substantially rigid, wherein the guide tube assembly comprises:
an inner tube having an interior passageway configured to receive the filament, and having a relatively low coefficient of friction to minimize drag force between the interior passageway and the filament as it travels to the print head, wherein the inner tube is made of a material that is permeable to moisture; and
an outer tube surrounding the inner tube, wherein the outer tube is made of a substantially moisture impermeable material and provides a substantially moisture-impermeable barrier around the inner tube.

2. The system of claim 1, wherein the inner tube is made of a polymeric material and the outer tube is made of a metallic material.

3. The system of claim 1, wherein the inner tube is made of one or more materials selected from the group consisting of nylon, polypropylene and polytetrafluoroethylene.

4. The system of claim 1, wherein the outer tube is made of a metallic material.

5. The system of claim 4, wherein the outer tube is made of stainless steel or metallized biaxially-oriented polyethylene terephthalate.

6. The system of claim 1, wherein:
at least a portion of the guide tube assembly connects the filament path from the consumable assembly to an additive manufacturing system housing.

7. The system of claim 1, wherein at least a portion of the guide tube assembly is flexible and self-supporting.

8. The system of claim 7, wherein the outer tube is sufficiently rigid to define a self-supporting bend radius.

9. The system of claim 1, wherein the consumable assembly is configured to retain a supply of the filament in a low humidity environment, wherein the consumable assembly is configured to be retained by the additive manufacturing system.

10. The system of claim 1, wherein the consumable assembly is configured to retain a supply of the filament in a low humidity environment, wherein the consumable assembly is configured to connect to the additive manufacturing system with the guide tube, while located externally to the additive manufacturing system.

11. The system of claim 10, and wherein the consumable assembly is configured to circulate heated air about the filament.

12. A method of operating an additive manufacturing system, the method comprising:
feeding a filament of a hygroscopic material along a feed path from a filament supply through a guide tube assembly to a print head, wherein at least a portion of the guide tube assembly is substantially rigid, wherein the guide tube assembly includes:
an inner tube having an interior passageway configured to receive the filament and having a relatively low coefficient of friction to minimize drag force between the interior passageway and the filament as it travels to the print head, wherein the inner tube is made of a material that is permeable to moisture; and
an outer tube surrounding the inner tube, wherein the outer tube is made of a substantially moisture impermeable material; and
blocking ambient moisture from reaching the filament while the filament travels from the filament supply through the guide tube assembly to the print head;
receiving the filament in the print head;
heating the hygroscopic material of the filament in the print head to a flowable state; and
selectively depositing the hygroscopic material of the filament in the flowable state by forcing solid filament into the filament material in the flowable state to form a 3D part in a layer-by-layer manner substantially without voids.

13. The method of claim 12, wherein moisture content of the filament is substantially the same when received in the print head as when entering the guide tube assembly.

14. The method of claim 12 and further comprising:
storing the filament supply in a humidity-controlled enclosure, wherein the filament is fed through the guide tube assembly directly from the enclosure.

15. The method of claim 12 and further comprising:
monitoring humidity levels along the feed path through the guide tube assembly.

16. The method of claim 15, and further comprising controlling the humidity levels to remain below a threshold value.

17. An additive manufacturing system, comprising:
a print head configured to selectively receive a filament made of a hygroscopic material, heat the hygroscopic material of the filament into a molten pool, and drive filament into the molten pool to deposit the molten hygroscopic material of the filament through an extrusion nozzle to form a 3D part in a layer-by-layer manner; and
a guide tube assembly configured to be coupled to the print head and configured to be coupled to a consumable assembly, the guide tube assembly configured to guide the filament to the print head, wherein the guide tube assembly wherein at least a first portion of the guide tube assembly is substantially rigid and a second portion is flexible, the guide tube assembly comprising:
an inner tube made of a polymeric material and having an interior passageway configured to receive and the filament; and
an outer tube made of a metallic material,
wherein the outer tube surrounds the inner tube along substantially an entire length of the flexible guide tube assembly and forms a continuous barrier between the inner tube and an ambient environment, wherein the continuous barrier is substantially moisture-impermeable and substantially oxygen-impermeable.

18. The system of claim 17 and further comprising:
a humidity-controlled enclosure for storing a filament supply, at least a portion of the guide tube assembly provides the filament path from the enclosure to the additive manufacturing system housing.

19. The system of claim 17, wherein the inner tube is made of one or more materials selected from the group consisting of nylon, polypropylene and polytetrafluoroethylene, and wherein the outer tube is made of a material selected from the group consisting of stainless steel and metallized biaxially-oriented polyethylene terephthalate.

* * * * *